United States Patent [19]
Hiltz et al.

[11] Patent Number: 6,111,522
[45] Date of Patent: Aug. 29, 2000

[54] MULTIPLE ELECTRONIC PURSE PARKING METER

[75] Inventors: Kenneth Scott Hiltz; John Daniel Doucette, both of Halifax; Gregory Andrew Fill, Kempville; Neil Stuart Erskine, Halifax, all of Canada

[73] Assignee: J. J. Mackay Canada Limited, Canada

[21] Appl. No.: 09/298,697

[22] Filed: Apr. 23, 1999

[30] Foreign Application Priority Data

Apr. 24, 1998 [CA] Canada ................................ 2236181
Mar. 8, 1999 [CA] Canada ................................ 2265032

[51] Int. Cl.⁷ .................................................. B60Q 1/48
[52] U.S. Cl. ...................... 340/932.2; 368/90; 705/418
[58] Field of Search ............................ 340/932.2, 309.15; 368/90, 91, 92; 705/418

[56] References Cited

U.S. PATENT DOCUMENTS

| | | | |
|---|---|---|---|
| 4,880,097 | 11/1989 | Speas | 194/239 |
| 5,442,348 | 8/1995 | Mushell | 340/932.2 |
| 5,500,517 | 3/1996 | Cagliostro | 235/486 |
| 5,614,892 | 3/1997 | Ward, II et al. | 340/870.02 |
| 5,805,083 | 9/1998 | Sutton et al. | 340/932.2 |
| 5,841,369 | 11/1998 | Sutton et al. | 340/932.2 |
| 5,845,268 | 12/1998 | Moore | 340/932.2 |
| 5,903,520 | 5/1999 | Dee et al. | 340/932.2 |

*Primary Examiner*—Edward Lefkowitz
*Attorney, Agent, or Firm*—Hayes, Soloway, Hennessey, Grossman & Hage, P.C.

[57] ABSTRACT

A dual processor electronic parking meter (EPM) accepts a plurality of ISO compliant smart cards and authorizes payment of purchased time. The EPM of the invention is equipped with a card reader module (CRM) which accepts/validates transactions effected on smart cards, and also accepts a interface card for connection to a data terminal for revenue collection, meter configuration and meter firmware maintenance. The EPM includes a multi-lingual, intelligent, mixed-mode graphics and icon based display with greater visibility. When the EPM is idle, various sections of the meter are in a sleep mode for prolonging the life of the batteries. The EPM wakes up whenever a card is in the CRM, a coin is inserted, or a key for selecting the parking time and the type of operation is actuated. The EPM is easy to use by both the parking time purchaser and the money collector. The EPM contains a large memory and can be reprogrammed in the field to support new cards, different user languages, and system parameters such as rate, off time, or minimum purchased time. It is off-the-shelf solution provided with protection circuitry and designed to be used in unattended locations.

14 Claims, 6 Drawing Sheets

MULTIPLE ELECTRONIC PURSE PARKING METER

BACKGROUND OF THE INVENTION

1. Field of the Invention

This invention is concerned with electronic parking devices (EPD) and in particular with an electronic parking meter that accepts a multitude of forms of electronic payment.

2. Description of the Related Art

There are some problems associated with utilization of unattended coin vending machines, including mechanical parking meters. For example, motorists have to make sure they have the right change before buying parking time, or, the person collecting money from the meter must walk to each meter and manually empty the coin canisters. It is also known that coin accepting parking meters are more vulnerable to vandalism.

In the past, unattended vending or dispensing machines were generally limited to relatively inexpensive items. The expansion of the vending machines to more sophisticated and higher priced articles, exceeds the average consumer's pocket or purse change. A limited solution has been provided by the introduction of a bill changer in the proximity of the coin operated vending machines. Still, there are problems that affect both the potential user and the owner of a vending machine, as for example the cost of the bill changer located in the proximity of a vending machine, potential loss by use of counterfeit currency, security concerns associated with unattended vending machines, as well as to the bill changer itself.

Consumers are becoming more comfortable making unattended purchases with non-currency devices like a card of some type, having a personal identification number (PIN) which allows for a faster paced lifestyle with the potential of 24-hour access. Such access is becoming common for unattended bank teller machines, public transportation systems including parking meters, and in many other cases.

Electronic parking meters accepting credit cards avoid the above mentioned inconveniences because the accumulated parking time and sale records can be stored in an electronic memory. Transaction systems, including parking meters, using vend disposable or reprogrammable pre-paid cards, are presently widely used. The user may choose the amount of time purchased on the meter when using his debit card. An auditor is used to program the parking meter and/or to extract data from the parking meter using a hand-held device directly or indirectly connected to the parking meter.

However, magnetic stripe cards are insecure and are easy to fake by simply swiping the magnetic tracks with a reader and duplicating the data read onto a virgin card with the same user name. Also, banks and financial institutions are reluctant to allow "offline" purchases even for small value transactions, which could in fact be fraudulent. Therefore, most magnetic strip readers are on-line or attended, each transaction being verified/authenticated by a back end or remote computer system/database.

Integrated circuit cards (ICCs) or smart cards, while yet not as widely used/accepted, have significant advantages over magnetic stripe cards. Smart cards can hold significantly more data about cardholder than is traditionally held on a magnetic strip. Smart cards typically employ internal memory and a CPU or processor on the chip, allowing for dedicated application to reside on the card. Sophisticated security algorithms and cryptography programs can be employed on the cards, protecting sensitive data from theft/attack. Security can be increased even further if the security algorithm or the cryptographic keys are held on a second ICC held inside the interface device (IFD) where the users insert their cards.

As these types of transactions become more popular, card readers adapted to collect data recorded on smart card terminals were also developed in parallel. For example, U.S. Pat. No. 5,500,517 issued in 1996 to Cagliostro, discloses a hand held device for collecting data recorded on a smart card terminal and transferring same to a remote computer. The value of purchase is subtracted from the balance on the card, or is charged to the card owner's account.

Banks and financial institutions have now accepted the level of security offered by these card access systems. At the present time, there are some bank endorsed electronic payment (e-purse) schemes known, whereby the monetary value loaded on consumers cards can be spent or accepted by point of sale terminals as well as off-line, unattended vending machines, or other interface devices, including parking meters.

U.S. Pat. No. 4,880,097 issued in 1989 to Speas, discloses a park card having a memory to be used with an electronic parking meter. The parking meter also accepts coins and paper bills. A hand-held auditor can be used with the parking meter through a cable or an infrared transmission system for gathering data from the parking meter. However, the parking meter does not include a card security access module and is not designed for low power consumption.

U.S. Pat. No. 5,614,892 issued in 1997 to Ward II et al., discloses an auditing system capable of processing and storing data derived from a vending machine, or a parking meter. A purchaser can buy parking time using a debit card or coins.

There are problems associated with mechanical meters, as well as electronic meters that do not support internal security modules. Non-electronic-purse parking meters can typically accept simple, logic or memory cards which offer lower security. Users have cash tied up in a dedicated card that can only be spent on parking. In addition, most current parking meters have a limited number of messages and displayed instructions, which are not easily visible.

Accordingly, there is a need for a robust, low-power, unattended, cash-less, multiple electronic purse parking meter, capable of accepting a plurality of debit/credit/smart cards, capable of authenticating payment, and capable of interacting with the user through a user friendly graphical interface.

SUMMARY OF THE INVENTION

The present invention solves totally or in part the above problems by providing an electronic parking meter (EPM) which accepts a plurality of cards, and securely authorizes/deposits payments of purchased time through internal e-purse security access modules.

It is an object of the present invention to provide an electronic parking meter (EPM) in a form of a module that fits existing standard meter casing models, on-street electronic parking devices (EPD) or electronic parking meters, pay and display machines (PDM), or electronic purse terminals (EPT).

It is another object of the invention to provide an EPM equipped with a card reader that accepts and validates transactions effected on major debit, credit and/or ISO compliant smart cards. The card reader module also accepts a interface card for connection to a data terminal for revenue collection, meter configuration and meter firmware maintenance via a communication protocol.

It is still another object of the present invention to provide a dual processor parking meter with a large memory and a multi-lingual, intelligent, mixed-mode graphics and icon based, graphic display module.

According to one aspect of the invention, a multiple purse electronic parking meter, accepting a multitude of forms of electronic payments is provided. The parking meter includes a card reader module for accepting a card and retrieving information of interest from the card, a key for selecting a type of operation and an amount of parking time, an event detector for generating an interrupt signal whenever user activity is detected by the card reader module or/and the key defining a parking meter event. A graphics display module is provided on the upper portion of the parking meter and includes a first memory means for storing a plurality of graphic messages and icons, a mixed-mode display for displaying a graphic message and/or an icon, a low power microcontroller for controlling the transfer of information between the first memory means and the mixed-mode display and for initiating a wake-up sequence on receipt of the interrupt signal. A second memory means for storing an operating system and customer data, and processing means for switching from a sleep mode into a full power operation mode in response to a wake-up sequence are provided on a mother board module. The processing means also determines the source of the interrupt signal, and controls accordingly the mixed-mode display. The first and second memory means are under the supervision of the operating system.

Advantageously, various sections of the EPM are in a sleep mode when the parking meter is idle, so as to prolong the life of the batteries. Furthermore, the life of the electronic components themselves is prolonged since they are not fully powered during the sleep mode.

Another advantage of the EPM of the invention is that it is designed to be used in unattended locations and to remain unaffected by extreme environmental conditions. The invention also provides an off-the-shelf solution, easy to manufacture, cost effective, and with provisions for future upgrades.

The major advantage of the EPM of the invention is that it is very versatile, being able to accept a variety of methods of payment. The EPM is also easy to use by both the parking time purchaser and the money collector, having a very friendly user interface, and increased data storage capacity. For increased security, the smart card access interfaces employ an internal integrated circuit card (ICC) module, referred to as a security access module, or secure application module (SAM), to give the e-purse scheme the desired level of security. The electronic purse devices (EPD) of the invention, allows a single interface device (IFD) to accept and authenticate more than one type of consumer e-purse card. Moreover, the EPM of the present invention may be reprogrammed in the field, to support new cards, different user languages, and system parameters such as rate, off time, or minimum purchase time.

BRIEF DESCRIPTION OF THE DRAWINGS

The present invention will be now explained by way of example only and with reference to the drawings where.

Similar references are used in different figures to denote similar components.

DETAILED DESCRIPTION OF THE EMBODIMENTS

In the following, the terms "rear" and "curbside" are used to define the side of the parking meter visible from the curb, while the terms "front", "user side", or "face" are used to define the side of the parking meter visible by the user of the parking facility.

Figure 1:
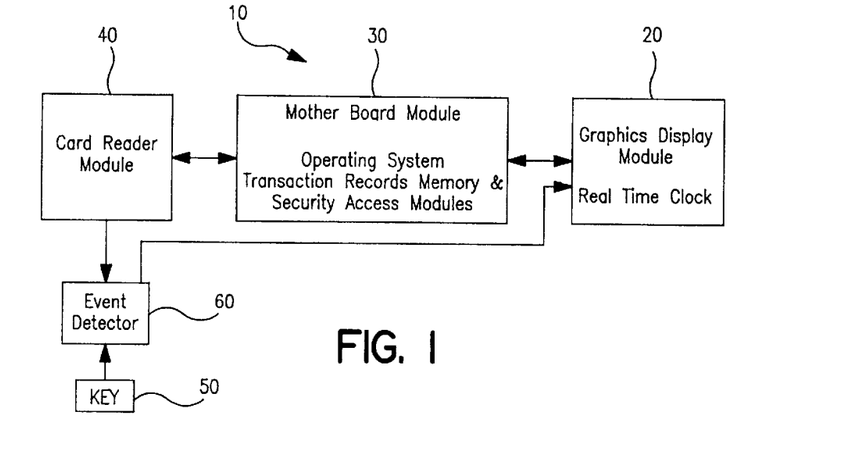
FIG. 1 is a high-level block diagram of the electronic parking meter (EPM) of the present invention.

FIG. 1 is a high-level block diagram of the electronic parking meter (EPM) according to the invention. The EPM 10 is a battery operated, fully integrated electronic parking meter, which accepts a plurality of e-purse cards, such as Transport Department (TD) Card, Mondex Card, and/or Visa Cash card.

EPM 10 comprises three major components or modules, namely a motherboard module (MBM) 30, an intelligent graphics display module (GDM) 20, and a card reader module (CRM) 40.

EPM 10 operates in an idle state, when no time is purchased. In this state, most of the electronics are in a "sleep" mode, so that the least amount of power is drawn from the battery. Nonetheless, GDM 20 continues to display messages, as this module continues to be powered in the idle state. When a momentary push bottom (key) 50 is pressed and a smart card is inserted in the card reader module 40, MBM 30 "wakes-up" for handling the smart card transaction. Once the customer has selected the parking time, the MBM 30 sends a command sequence to the GDM 20 to handle the timing and display functions.

An event detector 60 detects insertion of a card or actuation of the key 50, and changes the state of EPM 10 from sleep mode to operation mode. GDM 20 is a custom designed intelligent mixed-mode graphics and icon based module, which can perform a sequence of scrolled messages and switching of two static messages at pre-setable rates. The GDM 20 may also overwrite the above mentioned background graphic images with a half or full height scrolling or static a clock display. GDM 20 uses a two-face liquid crystal display (LCD) 15 shown in FIG. 2.

Figure 2:
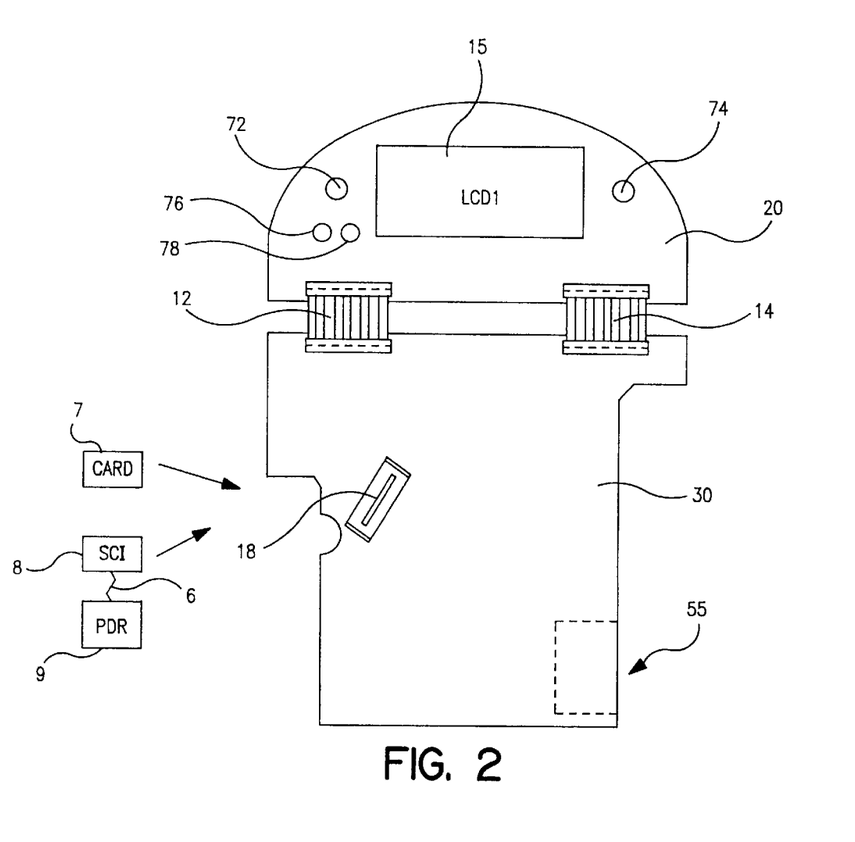
FIG. 2 is a front view of the graphics display module (GDM) and the motherboard module (MBM) of the EPM.

The front side of display 15 may display icons, time, currency, and messages/instructions in various languages. The messages may be called directly by the user, e.g. "Insufficient_Balance", "Change_Card", "Processing", or may be initiated by the EPM 10, e.g. countdown time, time expired, no parking, free parking. Icons are used to indicate error conditions such as low battery, no parking, invalid coin, invalid cash card, and out of order.

The rear or curbside of display 15 uses a dual colour LCD, which may display icons. LEDs are used to indicate park running time, time expired, and low battery. GDM 20 also comprises a real time clock and calendar for system timing functions as well a memory for storing the messages and system configuration data.

MBM 30 comprises an application specific integrated circuit (ASIC), and a memory with the operating system. All cash card transactions and audits are performed by this module while timing and display functions are dispatched to the GDM 20. There are preferably three different memory areas: one area for primary data, another area for a mirror image of the current data being collected, and a third area which holds the previous collection data.

CRM 40 accepts ISO standard compliant cards. The orientation of the CRM 40 is such that it requires "chip-up" insertion of the card and therefore, the reading contacts are kept above the card while providing for a large opening on the lower side of the card reader receptor to expel any foreign objects inserted in the card acceptor slot.

FIG. 2 illustrates the user side of a parking meter equipped with the MBM 30 and the GDM 20. The GDM 20 is connected to the MBM 30 via two nine-pin hardwired wishbone connector 12. Connectors 12 and 14 are provided for optional upgrades, as discussed later. The CRM 40 and the MBM 30 may be alternatively lumped together logically as their functions are intimately connected.

Seen from the user side, GDM 20 comprises two-face liquid crystal display (LCD) assembly 15 and LED's 72 and 74 for providing the user with various indications of the operation of the EPM 10.

A battery compartment is provided on the backside of the meter 10. Commercially available, off-the-shelf batteries which fit within the battery compartment and occupy the least amount of space may be used. The batteries are welded together for a secure assembly.

The card reader module 40 is designed to accept ISO standard compliant cards 7 or smart cards, and a smart card interface (SCI) 8 for data retrieval. FIG. 2 shows SCI 8 connected to a portable data retriever (PDR) 9 over a cable 6. The parking meter 10 may be provided with a cash slot, a coin chute, and the appropriate circuits for detecting when a coin enters the coin chute and for determining the denomination of the coins. This option is not illustrated and discussed in detail in U.S. Pat. No. 5,573,099, dated Nov. 12, 1996, entitled Apparatus and Method for Identifying Metallic Tokens and Coins, assigned to the same assignee as this application and incorporated herein by reference.

The cards 7 or SCI 8 must be inserted in card acceptor slot 18, which is capable of reading the information on the card/SCI. The SCI 8 is a simple human interface. The SCI 9 provides a direct connection to the card reader contacts through a "card like" sleeve that is inserted into the electronic purse device (EPD) card acceptor slot 18. It has its own interface circuit encased in the plastic case that the sleeve protrudes from. The circuit is powered during any communications/data transfer.

The PDR 9 is provided as a powerful multi-role platform for all EPD (EPM, PDM, EPT) applications and a brief description is provided by way of example. The PDR is a ruggedized, hand held DOS computer, used to replace manual collection of physical money from e-purse devices, such as the EPM 10. PDR 9 could be used for retrieving electronic cash transaction data and data file from the EPM 10, for meter configuration, meter firmware diagnostic information, for uploading of common data file and transferring this data to a central computer system (CCS), as well as for downloading of operational files e.g. blacklists, profiles, from the CCS. The PDR 9 has a RAM memory acting as the user disk. It may also include an integrated microphone and speaker. Remote communication and control functions can also be performed using an infrared (IR) or (IrDA) an optical serial port, 76 and 78.

A pre-configured blacklist file may be loaded into the EPD via the PDR 9. This enables the EPD to authenticate or to reject a card based on the category defined by the pre-configured blacklist, i.e. by card serial number, by range of card numbers, or by date of issue. The PDR 9 is a simple carrier of data and makes no decision about the data integrity. These decisions are made by the CCS. The CCS can identify whether two cards having the same number have been used in two different parking lots, may signal when a withdrawn card is used, and can compare authorized signatures for signed transactions.

Figure 3:
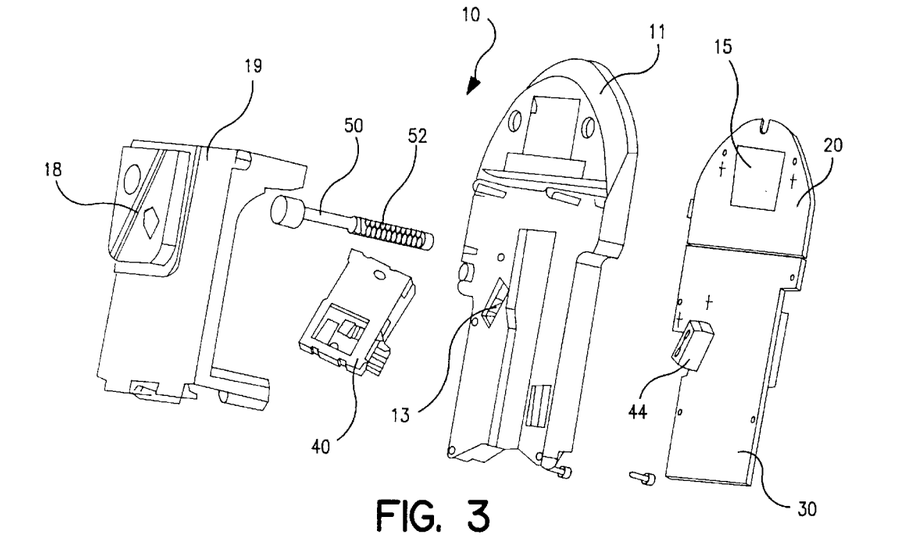
FIG. 3 is an exploded view showing how the card reader module (CRM) the GDM and the MBM are assembled.

FIG. 3 is an exploded view showing how the card reader module 40, the GDM 20 and the MBM 30 are assembled to a mechanical support 11 of the parking meter 10. The card reader module 40 is fixed on MBM 30 with a card reader receptacle 44 looking towards the user's side. Support 11 has a matting opening 13 for accommodating the card reader receptacle 44 of the card reader module 40. Housing 19 with the card acceptor slot 18, is placed over the opening 13, with the card acceptor slot 18 aligned with the card reader receptacle 44. Push-button switch or key 50, is used to set the parking time, to accept a transaction, or to confirm a split payment, and is placed in the vicinity of the card acceptor slot 18. Key 50 comprises a spring 52 preferably made of stainless steel. The functions of the EPM 10 are initiated whenever key 50 is actuated and the messages instructing the user how to complete a particular sequence, are displayed on the LCD 15.

Figure 4:
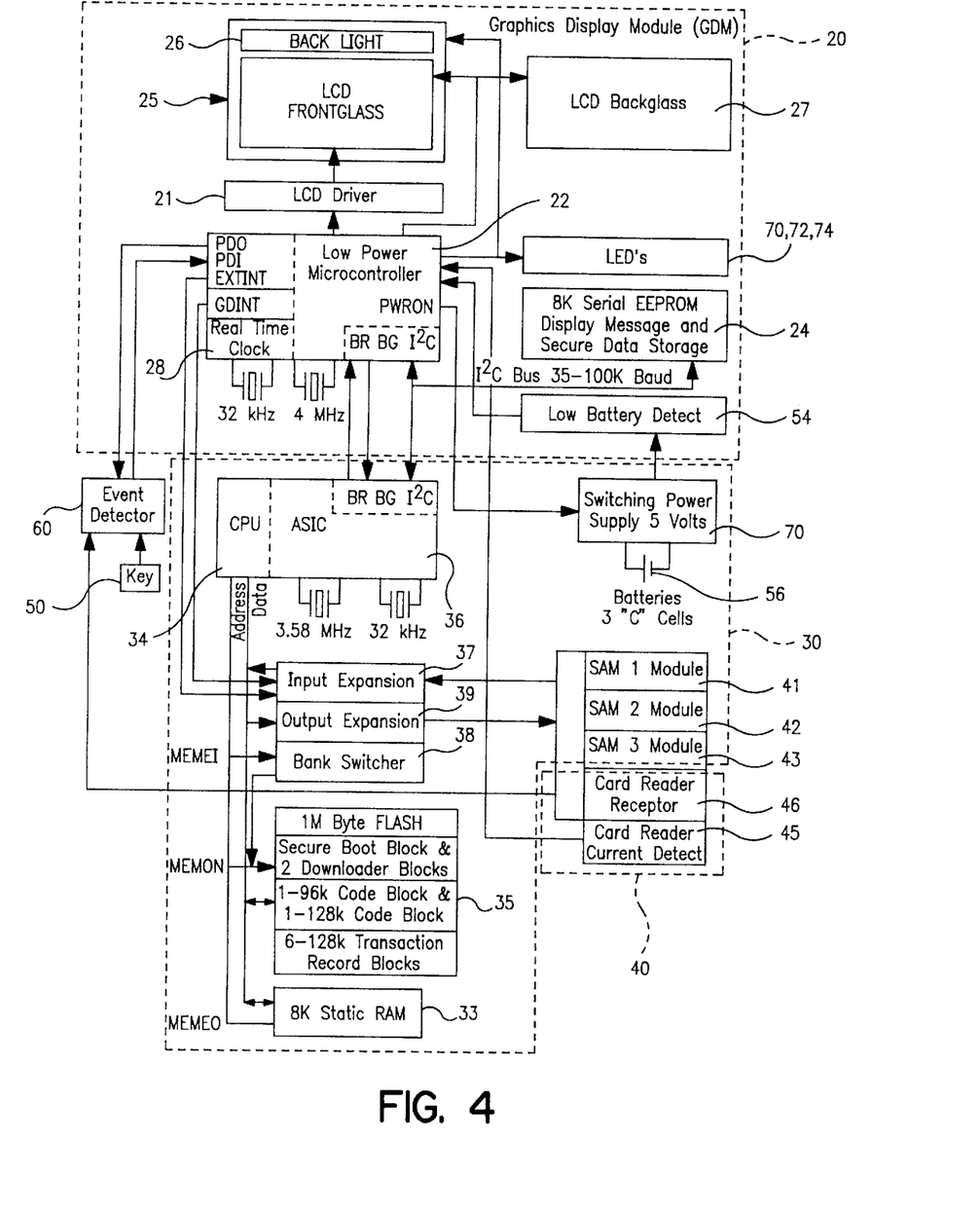
FIG. 4 is a block diagram of the EPM.

FIG. 4 is a block diagram of the EPM 10 and each module of the EPM 10 is described next under separate title.

The Card Reader Module

The CRM 40 accepts standard ISO cards, and also accepts SCI 8 of PDR 9. As indicated above, this enables data from the EPM 10 to be downloaded into a central computer. The communication protocol used in current practical implementation of the EPM 10 is preferably standard asynchronous RS232 at 9600 Baud, with TTL logic levels.

Receptacle 44 comprises an off-the-shelf card reader module 40 with an attached printed circuit board containing a card reader receptor 46, a card acceptor slot 18, a connector (not shown), and a current detection circuit 45 for monitoring the power consumption of the card reader receptor 46. The current absorbed by the card reader receptor 46 is measured when the EPM 10 is operational, (wake-up state), and is disabled and an error flagged, if excessive current is detected by unit 45. Preferably, the current detection circuit 45 has a programmable over current setpoint up to 200 mA. In addition, the components of the CRM 40 are designed to "blow-open" and to provide a first line defense against longer duration high voltages. The CRM 40 is a low cost module, easy to be replaced "on street".

CRM 40 has no moving parts, is accessible for cleaning, and can be easily replaced. The card reader receptacle 44 is physically open on its lower side allowing most debris inserted into the card slot to either fall through into the main parking meter housing or to be easily cleared from the mechanism.

CRM 40 is susceptible to vandalism by people shoving objects into the card acceptor slot 18. If the object is metallic, there is a good possibility that the card power supply will draw excessive current. To address these potential problems, card reader circuit board contains a low number of components making it easy and cost effective to repair or replace, should the need arises. CRM 40 becomes a sacrificial component in order to protect the rest of the parking meter electronics from high voltage, high current caused by intentional tampering and/or vandalism.

The Graphics Display Module

The intelligent graphics display module 20 handles all of the timing and display functions of the parking meter. GDM 20 is preferably mounted to the meter casing with self taping machine screws.

The GDM 20 is a custom designed module, which includes a low power microcontroller 22, an LCD driver 21, a two-face LCD 15, 70, 72, 74 and a memory 24. LCD 15 comprises a front face (frontglass) display 25 with a backlight 26, and a dual colour curbside (backglass) display 27. The front face display 25 is preferably a mixed-mode graphics and icon based LCD, and the curbside display 27 is preferably an icon based red/silver LCD.

The low power microcontroller 22 handles all LCD graphic display updates, real time clock (RTC)/calendar and alarm functions, controls operation of LED 70, 72, 74, and of the LCD driver 21 for both the front display module 25 and the backglass 27. The single chip microcontroller 22 includes a watchdog function, a power-up function, an oscillator, as well as start-up and power-on timers.

GDM 20 is constantly running a real time clock 28 which uses a 32 kHz crystal controlled counter/timer internal to the microcontroller 22. This timer interrupts the microcontroller 22 every 15.625 ms. (1/64 second). This interrupt rate forms the basic timer for functions being performed by microcontroller 22. The GDM 20 also maintains the realtime clock/calendar 28 for system timing functions.

Memory 24 is in the embodiment of FIG. 4, a low power serial I²C EEPROM used to store LCD display messages, display scripts, meter configuration data and some smart card transaction data. A total message length of approximately 100, 16×16 characters is possible. The display scripts describe what and how messages are displayed on the LCD 15. Memory 24 communicates over a two wire I²C bus with both microcontroller 22 and with MBM 30. A two wire I²C port is a standard serial interface used to communicate with multiple devices.

The LCD driver 21 is a very low power integrated circuit used to control LCD 15. Microcontroller 22 interfaces with driver 21 over a parallel port. LCD driver 21 may be a Seiko SED1526, which is capable of driving up to 36 LCD outputs. This driver can flash the LCD segments at programmable rates of 0.5 Hz, 1 Hz, or 2 Hz. Six of the LCD segments can be programmed to flash at independent flash rates. It is to be understood that the above parameters are given by way of example only, the invention not being limited to units having the specific parameters disclosed herein.

The GDM 20 sets the parking meter priorities based on a graphic display languages (GDL) script stored in memory 24.

Figure 5:
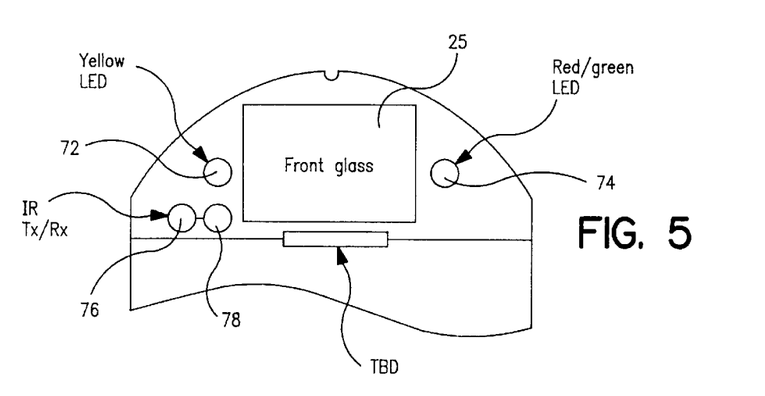
FIG. 5 shows a user side view of the GDM.

FIG. 5 illustrates the GDM 20 as viewed from the user side, showing a front glass display module 25 of mixedmode LCD 15, light emitting diode (LED) indicators 72, 74, infrared (IR) port 76, as well as the fully compliant optical (IrDA) port 78.

The front glass display 25 displays up to five 16×16 pixel characters or two rows of ten 8×16 pixel characters at one time. Front glass display 25 can perform a sequence scrolled messages and switching of multiple static messages at pre-setable rates. The GDM 20 may also overwrite the background graphic images above with a half or full height scrolling or static a clock display.

Figure 6:
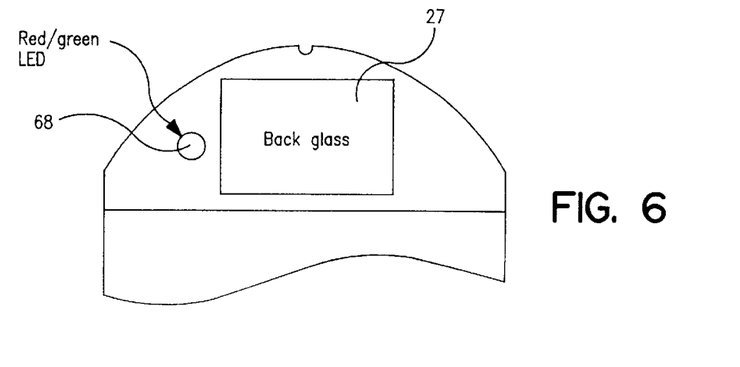
FIG. 6 shows a curbside view of the GDM.

FIG. 6 illustrates the GDM 20 as viewed from the curbside. The back glass display 27 of the LCD 15 as well as LED 70 exhibit visible information to a person looking at the parking meter from the curbside. LEDs 70 and 74 are bicolor, preferably red/green, while LED 72 has a third colour, preferably a "super bright" yellow. LED's 70 and 74 are used to indicate park running time in green and time expired in red. LED 72 flashes to indicate a low battery condition. Bicolor LED's 70 and 74 may be a Toshiba TLRAG178, or TO226AA models, or a Kingbright 59RSGCCA model. Yellow LED 72 may be a Kingbright L93YT or a Stanley HPY5066X model.

An optical serial port 76 and 78 is provided for IR communications with an internal receiver/transmitter (not shown). IR Transmitter may be Siemens LD2753 or Siemens SFH415U model, while IR Receiver may be Siemens SFH205.

The LCD and the LEDs are used to indicate special conditions generated within the system. The EPM 10 will indicate "Unidentified_Card" followed by "Remove_Card" if an invalid/empty card is inserted, or a card is improperly inserted with contacts down, backward, or with no contacts. If the card reader receptor 46 is jammed, the EPM 10 will display "Remove_Card" while displaying "No Parking" icons on red background area, and LED 72 will blink.

An EPM to hardware error is indicated by a EPM "SYS_ERROR", display message, the meter 10 goes to sleep mode, and will not wake up to card 7 insertion or key 50 actuation.

Figure 7:
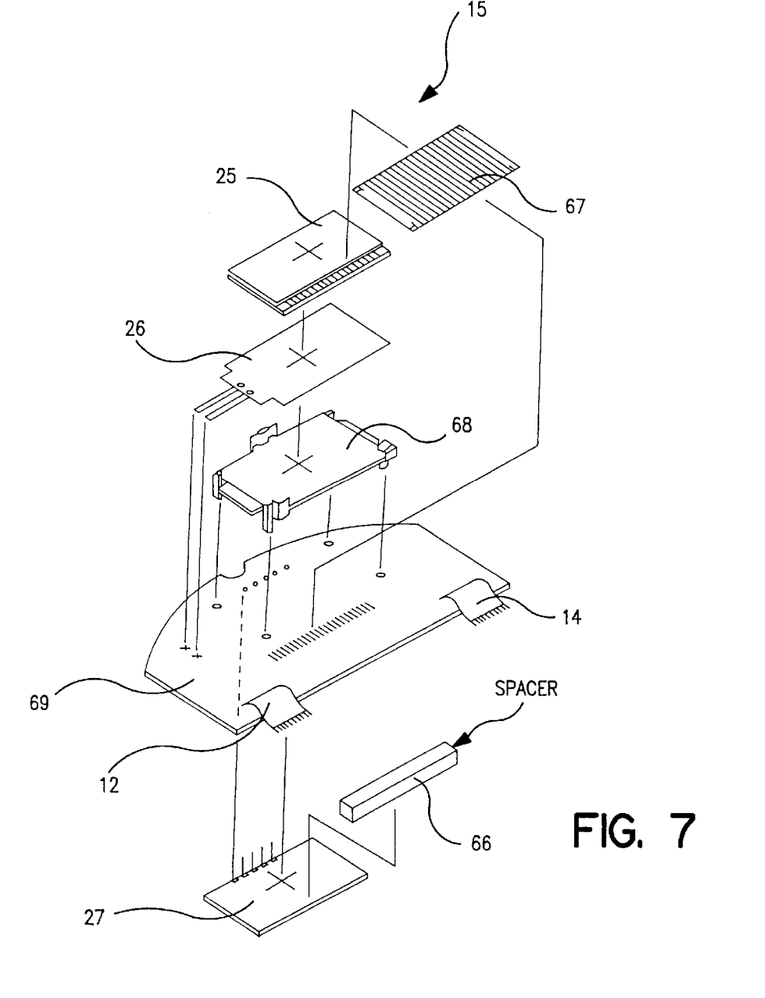
FIG. 7 is an exploded view of the two face LCD of the GDM.

FIG. 7 is an exploded view of the LCD display 15. It shows front glass LCD module 25 provided under a heat seal 67 and an electro-luminescent backlight panel 26 supported by a clear glass holder 68. Holder 68 and fishbone connections 12 and 14 are attached on one face of the PCB 69, while curbside display 27 is attached to the opposite face of the PCB 69 through a spacer 66.

The front glass LCD module 25 is translucent, and can be backlit by the electro-luminescent panel 26. Backlight panel 26 lights momentarily when a customer is interacting with the parking meter. It may be configured to operate only through a range of night time hours. The active area for the backlight panel 68 is the same as the front glass 25 active area. Optionally backlight panel 26 may be replaced by a LED light-pipe backlight, by mounting coloured LEDs at each end of the clear plastic glass holder 68.

Figure 8:
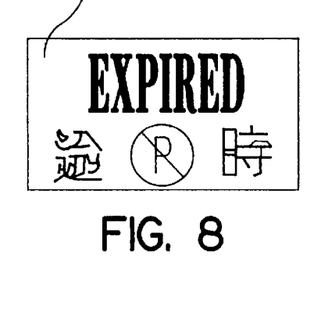
FIG. 8 is a front view of the back face of the LCD, showing an example of icons and messages.

The backglass LCD module 27 is a dual colour, preferably red and silver, icon based display. As shown in FIG. 8, backglass LCD module 27 is used to indicate for example "No Parking" sign with a flashing red international "No Parking" symbol, or that parking time has expired with alternating red background area (red flag) and "EXPIRED" in two or more languages and linked as one icon.

Figure 9:
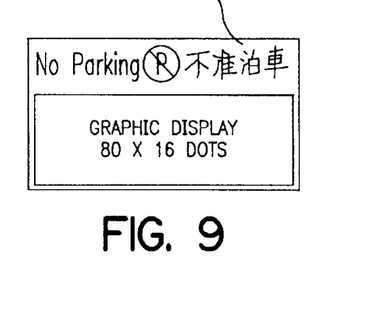
FIG. 9 is a front view of the front face of the LCD, showing an example of graphics and icons.

Front LCD display 25 is a mixed-mode display utilizing both pixel and icon based graphics, having a size smaller than the GDM board size, and an active area or graphics size of 14 mm×43 mm. As shown in FIG. 9, Front display 25 can display graphics or text in at least two languages, as well as symbols or pictures. More independently controlled icons located above graphic display area, may optionally be used to indicate messages like "No Parking" in two languages; the international "No Parking" represented by character P with the symbol Æ over it; the picture of a battery to indicate "low battery" status; blinking "00:00" and the red LEDs 70, 74, when in an expired state; and/or an encircled "X" to indicate "invalid coin".

Motherboard Module (MBM)

All cash card transactions and audits are handled by the MBM 30, while timing and display functions are dispatched to the GDM 20. GDM 20 will be connected to the MBM 30 via a fine pitch 18-pin ribbon cables 12 and 14. MBM 30 is mounted to the meter casing with self taping machine screws.

Returning to FIG. 4, MBM 30 comprises, an application specific integrated circuit (ASIC) 36 with a primary microprocessor 34, and memories 33 and 35 for storing the operating system and the transaction records.

ASIC 36 is designed in the current implementation shown in FIG. 4, to contain a great deal of functionality. While all of the functions are not necessarily required for the embodiment of the EPM 10 shown in FIG. 4, their existence allows for possible future upgrades and improvements without major re-engineering.

Microprocessor 34 may be an 8-bit Z80 microprocessor embedded in ASIC 36. It has a relatively low-power consumption and has 8-bit non-multiplexed address and data buses, a 160B internal RAM, and 40 memory mapped I/O registers for all ASIC functions timers, etc. As indicated above, microprocessor 34 was selected for a specific application of the parking meter, but the invention is not limited to this particular type. Other microprocessors may also be used, for this or for different applications.

ASIC 36 is also provided with an I²C communication port. This interface communicates in the embodiment of FIG. 4 with the corresponding I²C port on memory 24 of GDM 20 and with the corresponding I²C port on low power microcontroller 22. A bus request (BR) and bus grant (BG) signals allow the microprocessor 34 to quickly gain control of the I²C bus in order to communicate with GDM 20.

ASIC 36 is also provided with a 32 kHz timekeeping oscillator, which is the source for both the internal real time counters, and a 60 second counter (not shown) used to enable the microprocessor 34 to directly access the counter and alarm registers on the ASIC 36. There is a maskable time-of-day alarm interrupt and a non-maskable midnight roll-over interrupt. The 60 second counter may be set to cause an interrupt at intervals between 1 and 60 second.

A watchdog timer is also provided on ASIC 36. If the timer is not reset by microprocessor 34 within 64 seconds, the microprocessor reset will be activated. This prevents processor 34 and ultimately the parking meter from "locking-up" due to a glitch. The maximum watchdog timeout period is 64 seconds. The watchdog is reset when the bus request (BR) changes from low to high. If there is no positive BR transition in the timeout period then the GDM 20 will display the "out of order" message, or turns on the "out of order" icon, if present, while cycling the power off and on again. If there is still no positive BR transition within the timeout period the meter will turn the power off, and will go to sleep. Only a manual reset or battery replacement will restart the meter.

ASIC 36 has two I/O ports, and 16 programmable I/O pins out of which 8 pins are reserved for future use in the embodiment of FIG. 4.

MBM 30 has a large memory, including a 8 kB static RAM 33 and a 1 MB flash low power memory 35.

RAM 33 is used for the operating system software stack, variable storage and temporary code space. Flash memory 35 is an internal, reconfigurable memory, used for system boot-up, the operating system software, and transaction record storage. A non-volatile memory of such large size is provided to enable storage of redundant and multiple copies of the smart card transaction records. The flash memory 35 is partitioned in 32 addressable memory blocks, each block having 32 kB.

The flash memory 35 is block-erasable only, so extra blocks must be available in order to accommodate new transaction records before the old records can be released for erasure. The memory area allocated for transaction record storage comprises six 128 KB blocks.

The embodiment shown in FIG. 4 supports three internal e-purse security access modules (SAM) 41–43 and one external ISO card reader module 40. Communication between a smart card and a SAM module is handled by microprocessor 34. For a transaction to take place, MBM 30 wakes-up on card insertion in the card acceptor slot 18 and performs a power-up and reset of the card to determine what type of card is inserted. Then, the appropriate SAM module is connected to microprocessor 34.

Modules 41–43 are preferably placed below the batteries in the battery compartment for easy access. SAMs 41–43 include current limiting resistors used to prevent excessive current flow if the SAM is improperly installed.

In order to support the SAMs, the card reader receptor 46, and memory 35, additional I/O ports are provided, shown as output/input expansion blocks 37 and 39. Block 39 provides additional two 8-bit output ports, and block 37 provides additional 8-bit input port. These expansion modules handle memory bank switching, security access modules 41–43 and power supply control.

A memory bank switching system 38 is provided, as indicated above, to handle the large amount of memory attached to microprocessor 34. Bank switching is accomplished by adding 5 bits to the address bus. These 5 bits are provided by output expansion module 39.

Event detector 60 is physically provided on the MBM 30. As indicated in connection with FIG. 1, this block initiates switching the mode of operation of EPM 10 from "sleep" to "operation". Event detector 60 detects a customer push button (key actuation) event, coin insertion event, or a cash card insertion event (contact 51 shown in FIG. 11). In response to these events, block 60 generates an interrupt to wake-up microcontroller 22 on the GDM 20. The GDM 20 also initiate graphic display service events, and a real time clock 28 tick event. GDM 20 wakes up the main processor 34, and the entire EPM 10.

GDM 20 also wakes up momentarily every ¹⁄₆₄ second. This provides for low power consumption, as EPM 10 stays off mode most of the time. The motherboard module (MBM) 30 is normally powered off when no interrupt is generated. The card reader interface is powered by a current monitored power supply.

A 10 pin, "RJ" type expansion connector is provided on the main board assembly 30. When assembled, this connector protrudes through the meter for allowing access without disassembly of the meter. The connector is normally covered with a dust/environmental cap/plug when not in use. The expansion connector provides for future expansion/external interface by providing appropriate signal at this connector. They include power/ground, bi-directional TTL level serial signals (RX/TX), a full I²C implementation (SDA/SCL), as well as, an external interrupt line.

The EPM 10 is powered by a 3 "C" cell alkaline battery pack 56 located in the battery compartment on the backside of the meter module. The replacement procedure is quick and simple. A backup capacitor maintains the meter operating system for the short period of time necessary to replace the battery.

The nominal output voltage of the batteries is 4.5 volts. Alkaline "C" cell batteries 56 have an energy rating of 7000 mA/hr. An estimated energy audit, assuming a 26 week (6 month) battery life, is in the range of 5,160 mA/h. This total audit of 5,160 mA/h represents a conservative 74% battery utilization over 6 months or an extended battery life of approximately 8 months.

A high-efficiency (approximately 85%) switching power supply 80 on the motherboard module (MBM) 30 supplies 5 volts to the EPM 10 when powered up. When powered down, the GDM 20 and some event detection circuitry 60 on the MBM 30 continue to run at a reduced unregulated voltage supplied directly from the battery pack 56.

Electronic Parking Meter Operation

The EPM 10 is operational with a "smart card" and can optionally accept coins. The user interface to the meter is either through the insertion of a card 7, a coin, or through a simple push button 50.

A smart card transaction may be a standard purchase or a split payment. A standard purchase procedure includes the following actions. The customer will press key 50 to select the parking time. For each button press, the amount of time increments until the maximum allowable time is reached. The base time for each button 50 actuation may be 15 minutes. The time then rolls over to residual time after maximum time is reached. The customer is required to "Insert_Card" in card acceptor slot 18. Any of these events (card 7 insertion or key 50 actuation) generates an interrupt signal, which wakes-up MBM 30 which performs a power-up of the parking meter 10. EPM 10 will cycle for a number of times displaying the followings: the parking time desired, the amount to be deducted from the card, and "Press_Key_To_Confirm" message in two or more languages. The customer authorizes the transaction by pressing again key 50. The EPM 10 cycles displaying "Busy_Processing", "End_Of_Transactions", and "Remove_Card" in two or more languages and alternating with the purchased parking time. As the customer removes the card 7, the EPM 10 displays countdown time.

Figure 10:
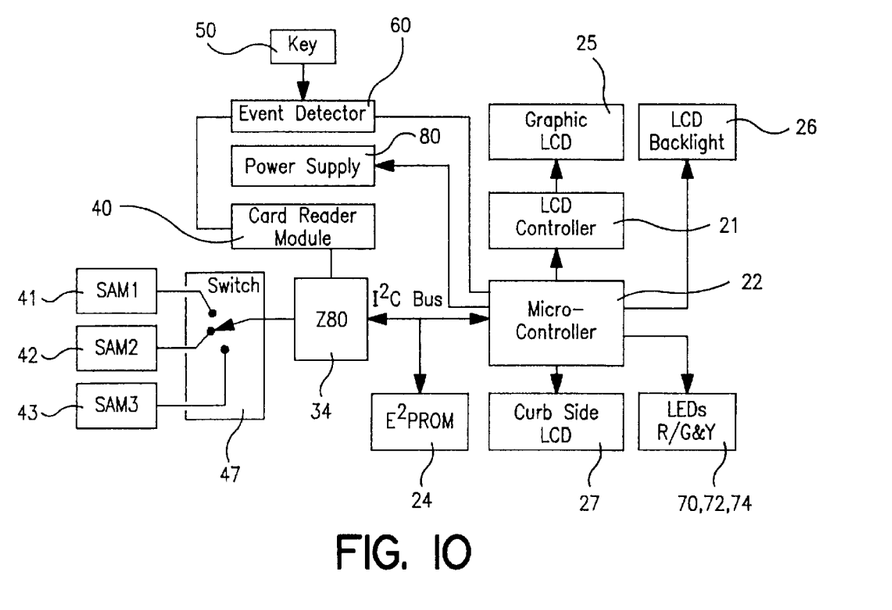
FIG. 10 is a functional block diagram of the EPM, showing the units involved in a smart card transaction.

FIG. 10 is a partial functional block diagram illustrating the operation of the electronic parking meter 10 for smart card management. When a card 7 is inserted in the CRM 40, MBM 30 performs a reset on the card, to determine what type of card is inserted. A switching circuitry 47 allows the operating system to select which security module 41–43 should be connected to the microprocessor 34 for the currently used smart card. This switching circuit 47 handles all of the I/O port allocation and timing functions required during the transaction. Communications between a selected SAM 41–43 and a card may be synchronous and/or asynchronous and is intermediated by the MBM 30.

The value of the transaction is deducted from the consumer card 7 after successful balance and authentication challenges are performed in conformity with the particular e-purse scheme employed in the transaction. The transaction data is stored redundantly in the transaction storage area of the flash memory 35 of the MBM 30. The GDM 20 displays the remaining parking time on both sides of LCD 15 until the time is zero, or another transaction takes place.

A multiple card purchase or split payment, is required when after a card 7 insertion the message "Insufficient_Balance" is displayed. The customer can "Press-to-confirm" to allow deduction of the amount left on the first inserted card, and then press "Split_Payment", remove the first card, and complete the payment with a second authorized card according to the standard purchase procedure.

Overcurrent/overvoltage protection

The SAMs 41–43 and CRM 40 have over current shutdown protection against metallic object insertion. The CRM 40 also has over voltage protection against vandalism.

Figure 11:
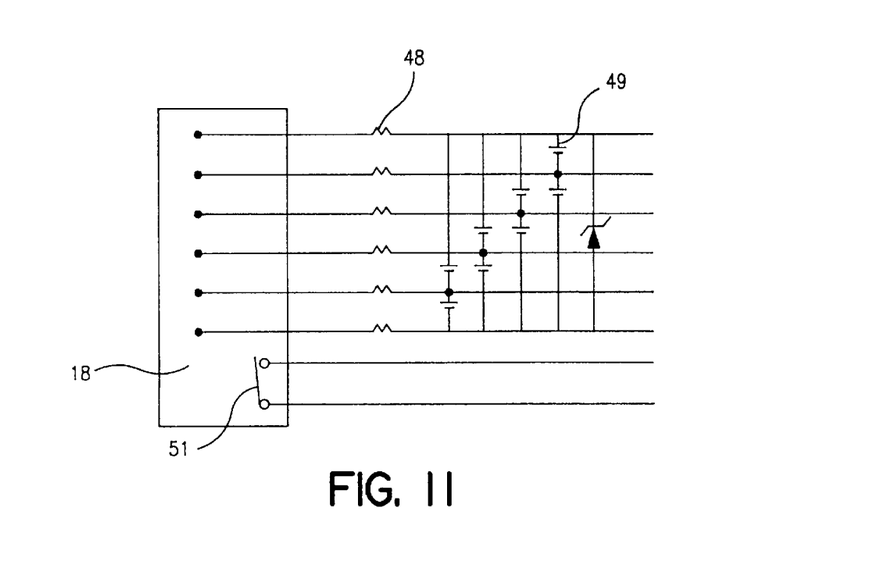
FIG. 11 is an electrical diagram of the overcurrent/overvoltage protection circuitry of the card reader module (CRM)

As shown in FIG. 11, the protection monitoring circuitry includes over-voltage crowbar protection diodes 49, and fusible resistors 48. Low resistance $\frac{1}{10}$ watt thin film resistors 48 are placed in series with all electrical connections within the socket 52 of the a card reader receptor 46. Crowbar protection diodes 49 are used to detect any high voltage entering the card receptor 46 in excess to +5 volts. The excessive current generated by the high voltage blows the thin film resistors 48, making them fusible links. Resistors 48 limit the current to and from the card reader receptor 46, and blow open when overvoltage conditions are present. Also provided on socket 52 is card detector switch 51 which signals event detector 60 that a card was inserted in the card reader receptor 46.

Power Management

Figure 12:
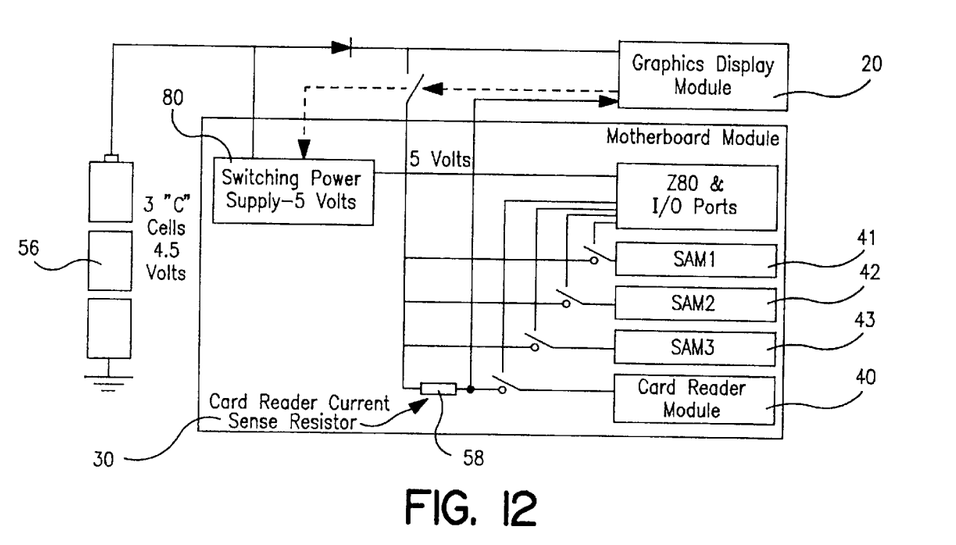
FIG. 12 is a functional block diagram showing the power management.

FIG. 12 is a functional block diagram showing the power management. Most of the time the GDM 20 is in a low power sleep mode. GDM 20 and event detector 60 are powered directly from the battery pack 56 (see also FIG. 4). When a card is inserted in the card receptor 46, the EPM 10 wakes up. When the EPM 10 wakes up, the high efficiency switching regulator 80, located on the MBM 30, is switched ON by the GDM 20, powering the whole meter at 5 volts. Resistor 58 is used by the GDM 20 to continuously measure the current absorbed by the card reader receptor 46 and blows open when a current in excess to a preset threshold is detected (e.g. 50 mA).

A low battery detector 54 located on GDM 20, (shown in FIG. 4) monitors the battery voltage once per hour and if it consistently detects a low battery threshold for 24 hours, a "low battery" condition is flagged and the EPM 10 is placed in a "low battery" status. The GDM 20 monitors the hourly battery condition, but it is the main processor 34 on the MBM 30 that counts and clears the conditions to extend the hours of "low battery" to days of "low battery". This allows the system 10 to ignore temporary "low battery" conditions due to heavy instant usage, and/or low temperatures. If at any time the battery voltage drops below an acceptable operating limit, EPM 10 goes immediately into an "Out_Of_Order" state. It is recommendable to replace batteries 56 at the beginning of the cold season, as battery capacity suffers at low temperatures.

The low battery threshold of the EPM 10 is 3.6 V, at temperatures ranging between −40° C. to +85° C. To ensure that the temperature specifications are met, all electronic components should be selected with the above temperature range. The EPM may also be protected against other environmental factors, such as humidity, with coating. In order to improve the coating process, the integrated circuits (ICs) should be surface mounted where possible, and all electronic devices should be exposed.

In summary, the invention is directed to an electronic parking meter or an electronic purse device (EPD) having means for accepting and authenticating a plurality of IC cards. The device includes two microprocessors and two memories for handling coin and IC card transactions and for storing current and previous transaction data.

The quiescent power consumption of the device in sleep mode is less than 600 mW. In addition to the low quiescent power consumption and depending upon what function is being performed, the system turns power ON and OFF for different parts of the device, in order to conserve battery power.

The GDM 20 provides a mixed-mode graphics and icons display with character font provided in at least two languages and with the height of the graphics display area not less than 12 mm, for greater visibility.

The protection circuitry, as well as the card transaction capabilities, makes the electronic purse device (EPD) suitable for unattended, off-line applications.

Numerous modifications, variations, and adaptations may be made to the particular embodiments of the invention described above without departing from the scope of the invention defined in its claims.

The embodiment of the invention in which an exclusive property or privilege is claimed are defined as follows:

1. A multiple purse, battery powered, stand alone electronic parking meter, comprising:

input/output means for interacting with a user and generating an interrupt signal in response to a user action defining a parking meter event;

a first memory means for storing a plurality of graphic messages and icons;

a mixed-mode display for displaying said graphic messages and/or said icons;

a low power microcontroller for controlling the transfer of information between said first memory means and said mixed-mode display, and for generating a wake-up sequence on receipt of said interrupt signal;

second memory means for storing an operating system and customer data; and processing means for switching from a sleep mode into an operation mode in response to said wake-up sequence, determining the source of said interrupt signal, and accordingly controlling said mixed-mode display, said first and second memory means, under supervision of said operating system wherein placing the processing means into sleep mode when the parking meter is idle allows the life of the battery to be prolonged.

2. A parking meter as claimed in claim 1, further comprising a real time continuously running clock for displaying time and data information, and for attempting to initiate said wake-up sequence at regular intervals.

3. A parking meter according to claim 1, further comprising a bank switch system for addressing said second memory means.

4. A parking meter as claimed in claim 1, further comprising an input expansion port and an output expansion port for extending the input/output and addressing capabilities of said processing means.

5. A parking meter as claimed in claim 1, further comprising a security access module for determining the type of a smart card, authenticating said smart card, and initiating a transaction between said smart card and said processing means.

6. A parking meter according to claim 1 wherein said customer data comprise current transaction data and previous transaction data.

7. A parking meter according to claim 1, wherein said input/output means comprises:

a card reader module for accepting a card and retrieving and storing information of interest from and to said card;

a key for selecting a type of operation and an amount of parking time; and an event detector for generating said interrupt signal whenever said key is actuated.

8. A parking meter according to claim 7, wherein said card reader module comprises:

a card reader receptor for receiving a card and establishing a plurality of communication points with said card; and a card detector for triggering said event detector whenever a card is inserted into said card acceptor.

9. A parking meter according to claim 7, further comprising a high current protection means for continuously monitoring the current supplied to said card reader module and disabling said parking meter if said current is higher than a preset threshold.

10. A parking meter according to claim 7, wherein said card reader module further comprises an overcurrent/overvoltage protection circuit.

11. A parking meter according to claim 7 wherein said input/output means comprises a coin accepting and identification module for signaling to said event detector whenever a coin is inserted.

12. A multiple purse, battery powered, stand alone electronic parking meter, comprising:

a card reader module for accepting a card and retrieving and storing information of interest from and to said card;

a key for selecting a type of operation and an amount of parking time;

an event detector for generating an interrupt signal whenever user activity is detected by said card reader module or/and said key, defining a parking meter event;

a first memory means for storing a plurality of graphic messages and icons;

a mixed-mode display for displaying a graphic message and/or an icon;

a low power microcontroller for controlling the transfer of information between said first memory means and said mixed-mode display, and for initiating a wake-up sequence on receipt of said interrupt signal;

second memory means for storing an operating system and customer data; and processing means for switching from a sleep mode into a full power operation mode in response to said wake-up sequence, determining the source of said interrupt signal, and accordingly controlling said mixed-mode display, said first and second memory means, under supervision of said operating system wherein placing the processing means into sleep mode when the parking meter is idle allows the life of the battery to be prolonged.

13. A parking meter as claimed in claim 12, further comprising a real time continuously running clock for displaying the time and date information and for attempting to initiate said wake-up sequence at regular intervals.

14. A parking meter according to claim 12, further comprising a bank switch system for addressing said second memory means;

an input expansion port and an output expansion port for extending the input/output and addressing capabilities of said processing means; and a high current protection means for continuously monitoring the current supplied to said card reader module and disabling said parking meter if said current is higher than a preset threshold.

* * * * *

UNITED STATES PATENT AND TRADEMARK OFFICE
CERTIFICATE OF CORRECTION

PATENT NO. : 6,111,522  
DATED : August 29, 2000  
INVENTOR(S) : Hiltz et al.

Page 1 of 1

It is certified that error appears in the above-identified patent and that said Letters Patent is hereby corrected as shown below:

Title page,  
Inventors should read as follows: -- Kenneth Scott Hiltz; John Daniel Doucette, both of Nova Scotia; Gregory Andrew Fill, Ontario; Neil Stuart Erskin, Nova Scotia, all of Canada --

Column 13,  
Line 34, after "system" insert -- , -- (comma).

Column 14,  
Line 43, after "system" insert -- , -- (comma).

Signed and Sealed this

Eleventh Day of June, 2002

*Attest:*

JAMES E. ROGAN  
*Attesting Officer*   *Director of the United States Patent and Trademark Office*